US012695674B2

(12) United States Patent　(10) Patent No.: US 12,695,674 B2
Krishnaswamy et al.　(45) Date of Patent:　Jul. 28, 2026

(54) SYSTEM AND METHOD FOR MANAGEMENT OF NETWORK SLICING USING HIERARCHICAL BLOCKCHAIN IN A NETWORK

(71) Applicant: JIO PLATFORMS LIMITED, Ahmedabad (IN)

(72) Inventors: Dilip Krishnaswamy, Bangalore (IN); Aayush Bhatnagar, Navi Mumbai (IN); Nitish Bhardwaj, Rishikesh (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 173 days.

(21) Appl. No.: 18/247,481

(22) PCT Filed: Mar. 24, 2023

(86) PCT No.: PCT/IB2023/052930
§ 371 (c)(1),
(2) Date: Mar. 31, 2023

(87) PCT Pub. No.: WO2023/187578
PCT Pub. Date: Oct. 5, 2023

(65) Prior Publication Data
US 2025/0016059 A1　Jan. 9, 2025

(30) Foreign Application Priority Data

Mar. 31, 2022　(IN) .............................. 202221019662

(51) Int. Cl.
*H04L 12/24*　(2006.01)
*G06F 9/455*　(2018.01)
(Continued)

(52) U.S. Cl.
CPC ............ *H04L 41/122* (2022.05); *H04L 41/16* (2013.01); *H04L 47/805* (2013.01)

(58) Field of Classification Search
CPC ...... H04L 41/122; H04L 41/16; H04L 47/805
See application file for complete search history.

(56) References Cited

U.S. PATENT DOCUMENTS 10,361,843 B1 *　7/2019　Suthar ................... H04L 9/3226
10,972,942 B2 *　4/2021　Ibek ...................... H04W 28/26
(Continued)

OTHER PUBLICATIONS

Adam Ibrahim Abdi et al., "Hierarchical Blockchain-Based Multi-Chaincode Access Control for Securing IoT Systems", Electronics, Feb. 25, 2022, Total pp. 21.
(Continued)

*Primary Examiner* — Esther B. Henderson
*Assistant Examiner* — Golam Mahmud
(74) *Attorney, Agent, or Firm* — FINNEGAN, HENDERSON, FARABOW, GARRETT & DUNNER LLP

(57) ABSTRACT

This present disclosure provides management of network slicing using hierarchical blockchain in network (108). System (102) receives user request to create one or more subnet slices (306) based on at least on NSSIs of at least one domain (802). System (102) allocates one or more distributed ledgers (104) associated with smart contracts for storing information pertaining to resource allocation of the at least one domain (802) and their respective one or more subnet slices (306). System (102) records one or more hierarchical blockchain transactions pertaining to the resource allocation by one or more distributed ledgers (104). System (102) updates one or more distributed ledgers (104) with hierarchical blockchain transactions of the at least one domain (802) and one or more subnet slices (306). Finally, system (102) provides end-to-end network slicing by managing the hierarchical blockchain transactions across at least one domain (802) for assisting activities in virtualized deployments in network.

24 Claims, 11 Drawing Sheets

(51) Int. Cl.

| | |
|---|---|
| *H04L 9/32* | (2006.01) |
| *H04L 41/122* | (2022.01) |
| *H04L 41/16* | (2022.01) |
| *H04L 47/80* | (2022.01) |
| *H04L 67/01* | (2022.01) |

(56) References Cited

U.S. PATENT DOCUMENTS

| | | | | |
|---|---|---|---|---|
| 11,159,391 | B2 * | 10/2021 | Aiello | G06F 9/45558 |
| 11,310,104 | B2 * | 4/2022 | Stockert | G06N 3/092 |
| 11,316,690 | B2 * | 4/2022 | Madisetti | H04L 41/044 |
| 11,418,410 | B2 * | 8/2022 | Xu | H04L 43/0817 |
| 2020/0057860 | A1 * | 2/2020 | Patil | H04L 41/5006 |
| 2020/0134620 | A1 * | 4/2020 | Aiello | H04L 67/1097 |
| 2020/0220791 | A1 * | 7/2020 | Aiello | G06F 9/45558 |
| 2021/0105784 | A1 * | 4/2021 | Young | H04W 72/53 |
| 2021/0168031 | A1 * | 6/2021 | Stockert | H04L 43/0876 |
| 2021/0360447 | A1 * | 11/2021 | Bor-Yaliniz | H04W 28/021 |
| 2022/0166667 | A1 * | 5/2022 | Celozzi | H04W 48/14 |
| 2022/0210012 | A1 * | 6/2022 | Stockert | H04L 5/0035 |
| 2023/0055913 | A1 * | 2/2023 | Dehghan Biyar | H04L 41/5019 |

OTHER PUBLICATIONS

Sujie Shao et al., "Computational Resource Allocation Strategy in a Public Blockchain Supported by Edge Computing", Wireless Communications and Mobile Computing, Apr. 15, 2021, Total pp. 08.

Pol Alemany et al., "Peer-to-Peer Blockchain-based NFV Service Platform for End-to-End Network Slice Orchestration Across Multiple NFVI Domains", 2020 IEEE 3rd 5G World Forum (5GWF), p. 151 to 156, Oct. 13, 2020, Total pp. 06.

Boubakr Nour et al., "A Blockchain-Based Network Slice Broker for 5G Services", IEEE Networking Letters, vol. 1, pp. 99-102, May 6, 2019, Total pp. 04.

International Search Report, PCT/IB2023/052930, mailed Jul. 10, 2023, Total pp. 02.

* cited by examiner

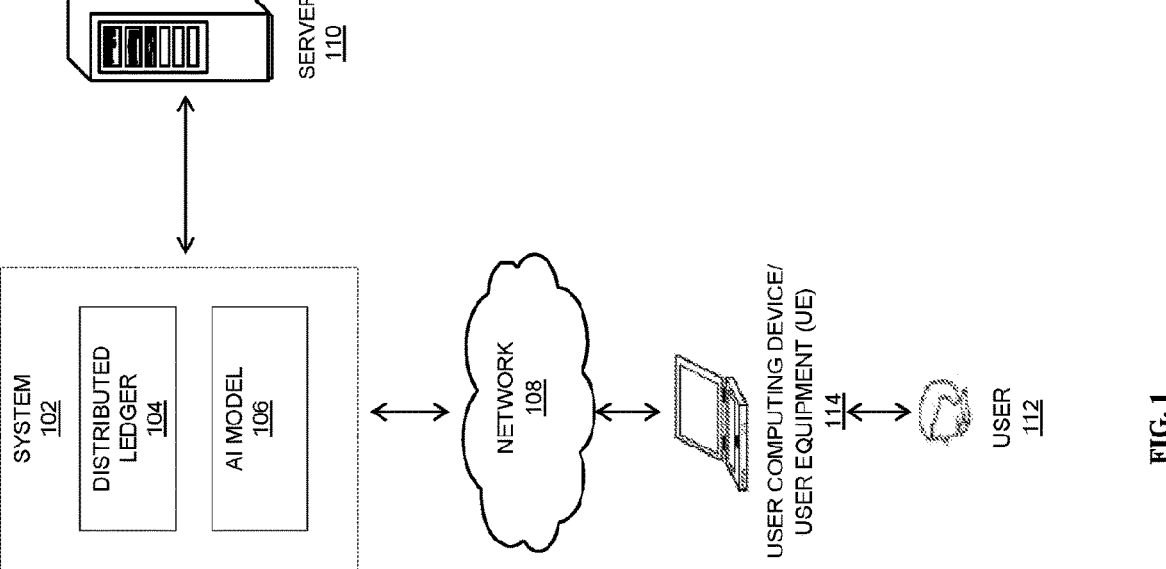
SERVER
110
SYSTEM
102
DISTRIBUTED
LEDGER
104
AI MODEL
106
NETWORK
108
USER COMPUTING DEVICE/
USER EQUIPMENT (UE)
114
USER
112
100
FIG. 1

400

500

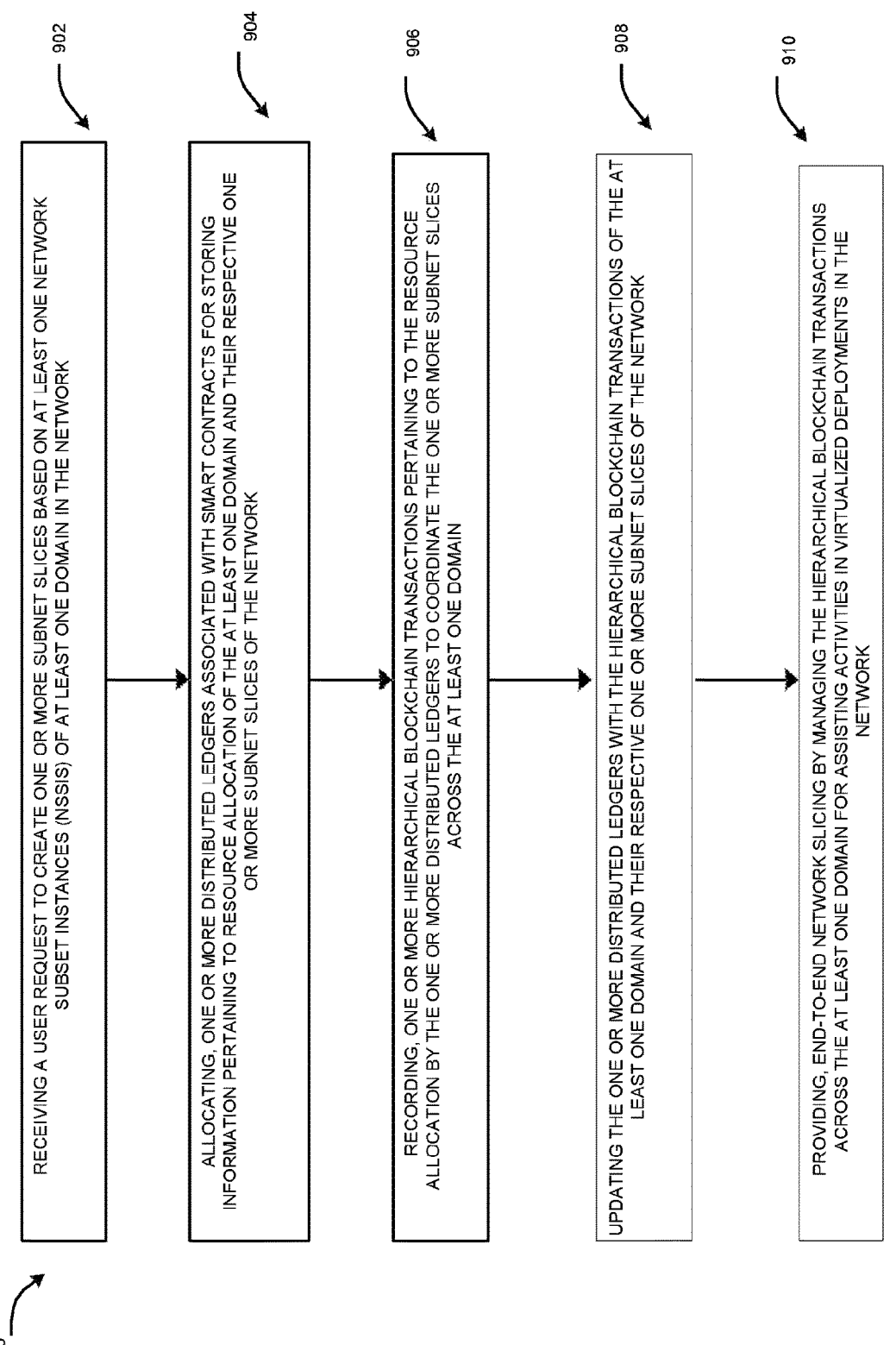

RECEIVING A USER REQUEST TO CREATE ONE OR MORE SUBNET SLICES BASED ON AT LEAST ONE NETWORK SUBSET INSTANCES (NSSIS) OF AT LEAST ONE DOMAIN IN THE NETWORK ⟶ 902

ALLOCATING, ONE OR MORE DISTRIBUTED LEDGERS ASSOCIATED WITH SMART CONTRACTS FOR STORING INFORMATION PERTAINING TO RESOURCE ALLOCATION OF THE AT LEAST ONE DOMAIN AND THEIR RESPECTIVE ONE OR MORE SUBNET SLICES OF THE NETWORK ⟶ 904

RECORDING, ONE OR MORE HIERARCHICAL BLOCKCHAIN TRANSACTIONS PERTAINING TO THE RESOURCE ALLOCATION BY THE ONE OR MORE DISTRIBUTED LEDGERS TO COORDINATE THE ONE OR MORE SUBNET SLICES ACROSS THE AT LEAST ONE DOMAIN ⟶ 906

UPDATING THE ONE OR MORE DISTRIBUTED LEDGERS WITH THE HIERARCHICAL BLOCKCHAIN TRANSACTIONS OF THE AT LEAST ONE DOMAIN AND THEIR RESPECTIVE ONE OR MORE SUBNET SLICES OF THE NETWORK ⟶ 908

PROVIDING, END-TO-END NETWORK SLICING BY MANAGING THE HIERARCHICAL BLOCKCHAIN TRANSACTIONS ACROSS THE AT LEAST ONE DOMAIN FOR ASSISTING ACTIVITIES IN VIRTUALIZED DEPLOYMENTS IN THE NETWORK ⟶ 910

SYSTEM AND METHOD FOR MANAGEMENT OF NETWORK SLICING USING HIERARCHICAL BLOCKCHAIN IN A NETWORK

TECHNICAL FIELD

The embodiments of the present disclosure generally relate to networks. More particularly, to system and method for management of network slicing using hierarchical block-chain in a network.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Fifth generation (5G)/sixth generation (6G) mobile and wireless networks will provide enhanced mobile broadband communications and are intended to connect things everywhere while enabling new use cases. A 5G Radio Access Network (RAN) uses 5G radio Frequency Division Duplex (FDD) frequencies to provide wireless connectivity to devices to deliver incredible applications. In comparison to earlier available generations of mobile and wireless networks, the 5G architecture is service based. This implies that wherever required, architecture elements are defined as network functions that offer their services to other network functions via common framework interfaces. To support and continue this wide range of services and network functions across an ever-growing base of user equipment (UE), the 5G networks extend network slicing concept utilized in previous generation architectures. With respect to scope related to that of 5G mobile and wireless network architecture, a network slice includes a set of defined features and functionalities that together form a complete Public Land Mobile Network (PLMN) for providing services to UEs.

Network slicing enables 5G networks to deploy multiple independent PLMNs, where each of the network slices is customized by instantiating only those features, capabilities and services required satisfying a given subset of the UEs or a related business customer needs. However, managing and controlling resource allocation, resource monitoring, resource provisioning and transactions recording for resources across each of the network slice is a challenge in the 5G/6G mobile and wireless networks.

Further, with respect to sixth-generation (6G) networks that are expected to provide performances superior to previous generations like 5G to meet requirements of emerging services and applications, such as multi-gigabit transmission rate, higher reliability, and sub 1 millisecond latency and ubiquitous connection for the Internet of Everything (IoE) seems challenging due to scarcity of spectrum resources and efficient resource management of network slices.

Hence, there is a need in the art, to provide hierarchical blockchain ledgers which can be used to support end-to-end network slicing in 5G Networks and enables eventual end-to-end co-ordination across the network slice domains while mitigating serious concerns such as resource management arising out of the 5G/6G mobile and wireless networks.

OBJECTS OF THE PRESENT DISCLOSURE

It is an object of the present disclosure to provide end-to-end co-ordination across network slice domains.

It is an object of the present disclosure to provide end-to-end coarse resource optimization for a network slice at slower time-scales.

It is an object of the present disclosure to provide smart processing in blockchain systems that involve introducing inferencing using machine-learned models at an edge of the blockchain systems.

It is an object of the present disclosure to allow allocation for processing of a slice/partition that can be performed based on the availability of resources at a different edge or cloud resource locations.

It is an object of the present disclosure to provide resource allocation for a slice/partition that while considering constraints such as network constraints such as latency or bandwidth for communication of information, storage constraints such as availability of storage, and read/write latencies, and bandwidth associated with such storage.

It is an object of the present disclosure to provide a blockchain ledger that can extend across various network slice domains operating at larger time scales relative to local ledgers for faster local resource optimization.

It is an object of the present disclosure to provide coarse-grain ledger updates for end-to-end resource optimization at a larger time-scale across network slice subnets.

It is an object of the present disclosure to provide input/feedback to respective network slice subnets for next epoch of distributed optimization in the network.

It is an object of the present disclosure to provide network slicing that is scalable, flexible, and programmable while providing on-demand resource allocation for different types of flows in 5G networks.

It is an object of the present disclosure to provide network slicing that involves both physical and virtual network functions.

It is an object of the present disclosure to provide network slicing that combines RAN and core network slices in 1-1 or one-to-many form.

It is an object of the present disclosure to provide network slicing where multiple RAN slices may connect to a single core network slice.

It is an object of the present disclosure to provide network slicing where one RAN slice can connect to multiple core network slices.

It is an object of the present disclosure to provide slice paths in network slicing that can be stitched dynamically based on requirements.

It is an object of the present disclosure to provide slice allocation in network slicing that can be done for multiple user plane flows with admission control for flows into slices.

It is an object of the present disclosure to provide hierarchical blockchain ledgers that can be used to support end-to-end network slicing in 5G Networks.

It is an object of the present disclosure to create ledgers for RAN/Transport/core domain resource allocations.

It is an object of the present disclosure to provide cross-domain ledgers that can be used to record transaction allocations for intra-network slices across RAN/transport/core domains.

It is an object of the present disclosure to provide end-to-end network slices that can include resources beyond the intra-network domains such as cloud or edge resources or private enterprise resources, and across different networks/network paths.

It is an object of the present disclosure to provide vDLT/blockchain based transactions related to dynamic resource allocations, resource utilization, soft threshold warnings, resource re-provisioning, etc. that can be recorded in the hierarchical ledgers with smart contract processing to meet constraints, with the hierarchical ledgers utilized to provide transparency and assist with future billing in hierarchical virtualized deployments.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure provides a system for management of network slicing using hierarchical blockchain in a network. The system may include one or more processors coupled with a memory. The memory stores instructions which when executed by the one or more processors causes the system to receive, a user request to create one or more subnet slices based on at least one Network Subset Instances (NSSIs) of at least one domain in the network. The system may be configured to record, one or more hierarchical blockchain transactions pertaining to the resource allocation by the one or more distributed ledgers to coordinate the one or more subnet slices across the at least one domain. Furthermore, the system may be configured to update, the one or more distributed ledgers with the hierarchical blockchain transactions of the at least one domain and their respective one or more subnet slices of the network. Finally, the system may be configured to provide, end-to-end network slicing by managing the hierarchical blockchain transactions across the at least one domain for assisting activities in virtualized deployments in the network.

In an embodiment, the system may further include one or more AI models, which may be configured to dynamically compute availability of resources in order to enable resource allocation to the one or more subnet slices of the at least one domain in the network.

In an embodiment, the one or more AI models may allocate resources to the at least one domain depending on at least one of network constraints and storage constraints. The network constraints may include latency or bandwidth for communication of information, and the storage constraints may include the availability of storage, and read and/or write latencies, and bandwidth associated with storage.

In an embodiment, the system may further be configured to admit, a set of packet flow in the one or more subnet slices which are based on a current admitted packet flows, an available slack, and resource availability.

In an embodiment, the system may be configured to map the set of packet flows to the one or more subnet slices, appropriately. The one or more subnet slices are predictively allocated to the set of packet flows, and dynamically scaled up or down, as required.

In an embodiment, the system may be configured to provide, updates from the one or more distributed ledgers for attaining end-to-end resource optimization at a larger timescale across the one or more subnets slices based on at least one or more parameters to provide end-to-end network slicing. The one or more parameters include a slice policy, a resource allocation parameter, a monitoring parameter, an analytics parameter, a prediction parameter, and an optimization parameter.

In an embodiment, the system may be configured to record, the hierarchical blockchain transactions by the one or more distributed ledgers for Intra-Network slices across the at least one domain. The Intra-Network slices are created with different constraints and entities, wherein the entities may comprise private enterprises, edge resources, and the like.

In an embodiment, the system may comprise the at least one domain which can include RAN/Transport/Core/Transport/RemoteCloud (for Remote Cloud-based applications), RAN/Transport/CollapsedCore/EdgeTransport/EdgeCloud (for Edge Cloud-based applications), and RAN/Transport/CollapsedCore/Transport/RAN for P2P information exchange.

In an embodiment, the system may comprise performing the activities in virtualized deployments which include future billing, updating records, and tracking application status and others.

In an embodiment, the system may comprise the user, where the user can be a network administrator, a network operator, and others In an embodiment, the system may comprise the one or more hierarchical blockchain transactions, which may include dynamic resource allocations, resource utilization, soft threshold warnings, resource re-provisioning, and others.

In an aspect, the present disclosure provides a method for management of network slicing using hierarchical blockchain in a network. The method comprises the step of receiving, by a system, a user request to create one or more subnet slices based on at least one Network Subset Instances (NSSIs) of at least one domain in the network. Further, the method comprises the step of allocating, by the system, one or more distributed ledgers associated with smart contracts for storing information pertaining to resource allocation of the at least one domain and their respective one or more subnet slices of the network. Further, the method comprises the step of recording, by the system, one or more hierarchical blockchain transactions pertaining to the resource allocation by the one or more distributed ledgers to coordinate the one or more subnet slices across the at least one domain. Furthermore, the method comprises the step of updating, by the system, the one or more distributed ledgers with the hierarchical blockchain transactions of the at least one domain and their respective one or more subnet slices of the network. Finally, the method comprises the step of providing, by the system, end-to-end network slicing by managing the hierarchical blockchain transactions across the at least one domain for assisting activities in virtualized deployments in the network.

In an aspect, the present disclosure relates to a non-transitory computer readable medium including processor-executable instructions that cause a processor to receive a user request to create one or more subnet slices based on at least one Network Subset Instances (NSSIs) of at least one domain in a network, allocate one or more distributed ledgers associated with smart contracts for storing information pertaining to resource allocation of the at least one domain and their respective one or more subnet slices of the network, record one or more hierarchical blockchain transactions pertaining to the resource allocation by the one or more distributed ledgers to coordinate the one or more subnet slices across the at least one domain, update the one or more distributed ledgers with the hierarchical blockchain transactions of the at least one domain and their respective one or more subnet slices of the network, and provide end-to-end network slicing by managing the hierarchical blockchain transactions across the at least one domain for assisting activities in virtualized deployments in the network.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein:

FIG. 1 illustrates an exemplary architecture (100) of a hierarchical blockchain based system (102) for management of network slicing, in accordance with an embodiment of the present disclosure.

FIG. 9 illustrates an exemplary flowchart for management of network slicing using hierarchical blockchain, in accordance with an embodiment of the present disclosure.

DETAILED DESCRIPTION

Figure 2A:
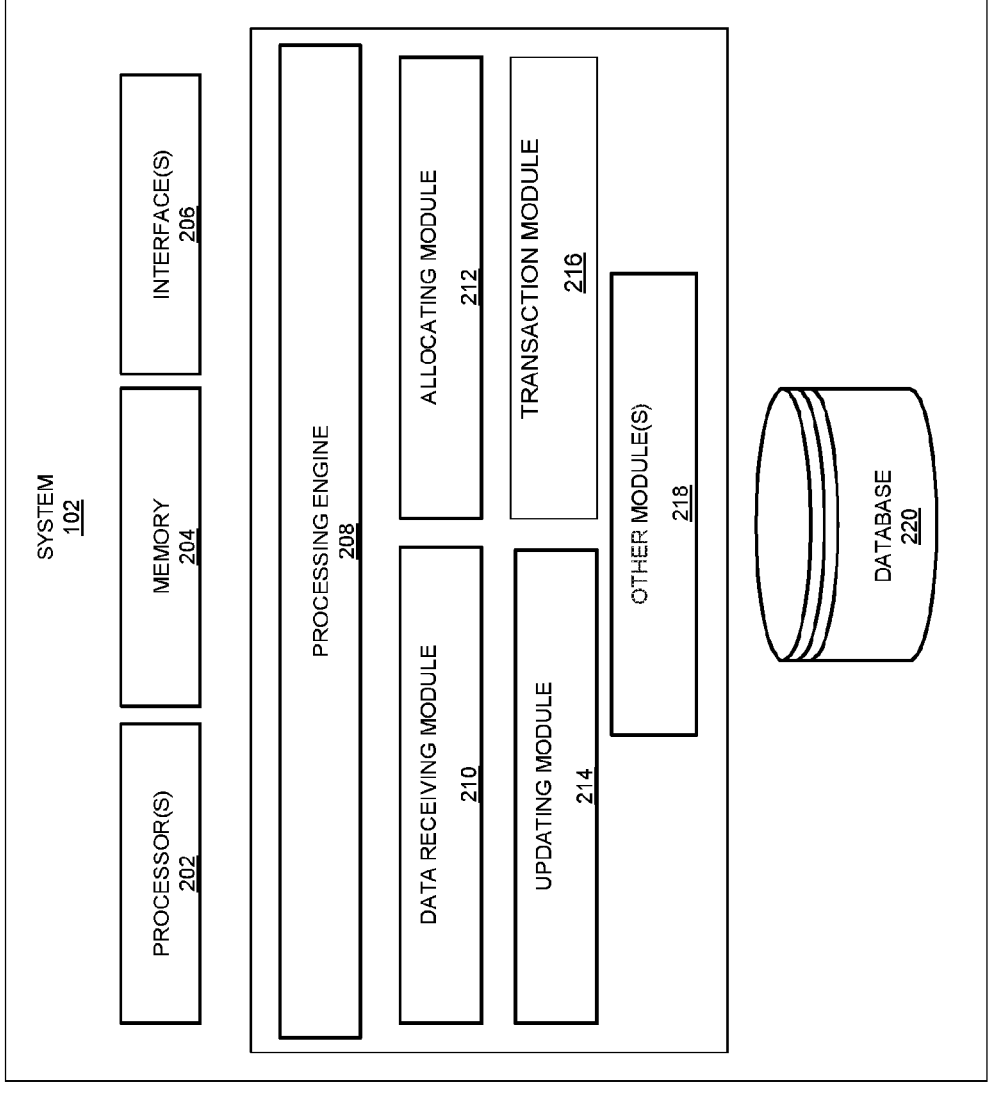
FIG. 2A illustrates an exemplary block diagram representation of the system (102) for management of network slicing using hierarchical blockchain, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In an embodiment, the term "Network slicing" refers to a scalable, flexible, programmable, on-demand resource allocation mechanism for managing different types of flows in 5G networks. For 6G networks, the network slicing may be performed by, for example, initially requesting one slice where slice resource type is determined to efficiently perform resource allocation and slicing deployment. Additionally, the network slicing in 6G may be performed based on bandwidth, mobility and latency parameters of the network. Network slicing can involve both physical and virtual network functions and can combine RAN and core network slices as, for example, 1-1 or one-to-many. Further, multiple RAN slices may connect to a single core network slice. Also, one RAN slice can connect to multiple core network slices. During network slicing, slice paths can be stitched dynamically based on requirements and slice allocation can be done for multiple user plane flows with admission control for flows into slices.

In another embodiment, the network slicing includes intra-slice isolation separation can be provided for greater reliability using multiple physical servers. Latency, bandwidth, memory, compute, energy, redundancy, service availability are critical parameters for selecting resources to be allocated for a network slice. The network slice is created while keeping in mind delay tolerant flows, delay sensitive flows, ultra-delay-sensitive flows (URLLC), low bandwidth flows, high bandwidth flows, real-time flows and the like. As may be appreciated, most flows have well defined needs and can be mapped to an appropriate slice. The network slices can be predictively allocated, and scaled up or down dynamically and can be created dynamically as needed. For network slicing, multiple CU-UP combinations can be created where each CU-UP can support a different set of network slices—one for eMBB, one for URLLC, and the like. The CU-UP may provide CU-CP with its list of supported network slices. The CU-CP can provide AMF with current list of supported slices and CU-CP can control creation of new slices in the CU-UP. Further, network functions in the core network can provide the NFRF (Network Function Repository Function) with a list of supported network functions. Furthermore, to realize an end-to-end network slice, slice components may be stitched in the RAN, core network, and across transport domains.

The present disclosure relates to networks, and more particularly, to system and method for management of network slicing using hierarchical blockchain in a network.

FIG. 1 illustrates an exemplary network architecture (100) in which or with which the system (102) of the present disclosure can be implemented, in accordance with an embodiment of the present disclosure. As illustrated, in an aspect, a system (102) is associated with a user (112). For example, the users (112) may include a network administrator, a network operator, and the like. The system (102) may be associated with a user computing device (114) (collectively referred to as devices (114) or user devices (114)) through a network (108). The computing devices (114) may be associated with the user (114). In a way of example and not as a limitation, the computing devices (114) may be further communicatively coupled to at least a centralized server (110) through the network (108). More specifically, the exemplary architecture (100) includes one or more distributed ledgers (104) and one or more AI models (106) associated with the system (102) for facilitating the management of network slicing.

In an embodiment, smart processing in system (102) can involve inferencing using the one or more AI models (106) which are machine-learned models at the edge. The one or more AI models (106) inferencing can be processed using specialized hardware components such as a GPU or a dedicated hardware accelerator. The computing resource allocation for processing for a slice/partition can be performed based on the availability of such resources at different edge or cloud resource locations. In addition, the resource allocation for a slice/partition will need to consider other constraints such as network constraints such as, for example, latency or bandwidth for communication of information or storage constraints such as availability of storage, and read/write latencies, and bandwidth associated with such storage.

In an embodiment, the system (102) receives a user request from the user (114) initiated from the user device (114) to create one or more subnet slices based on at least one Network Subset Instances (NSSIs) of at least one domain in the network. The system (102) receives the user request and records one or more hierarchical blockchain transactions pertaining to the resource allocation by the one or more distributed ledgers (104) to coordinate the one or more subnet slices across the at least one domain. The one or more hierarchical blockchain transactions include dynamic resource allocations, resource utilization, soft threshold warnings, resource re-provisioning, and others. In addition, the one or more AI models (106), dynamically compute availability of resources to enable resource allocation to the one or more subnet slices of the at least one domain in the network. Specifically, the one or more AI models (106) allocate resources to the at least one domain (802) (REF FIG. 8) depending on at least one of network constraints and storage constraints. The network constraints include latency or bandwidth for communication of information, and the storage constraints include availability of storage, and read and/or write latencies, and bandwidth associated with storage. Furthermore, the system (102) updates the one or more distributed ledgers (104) with the hierarchical blockchain transactions of the at least one domain (802) (REF FIG. 8) and their respective one or more subnet slices (306) (REF FIG. 3) of the network (108). Finally, the system (102) may be configured to provide, end-to-end network slicing by managing the hierarchical blockchain transactions across the at least one domain (802) for assisting activities in virtualized deployments in the network (108).

In an embodiment, the system (102) admits, a set of packet flow in the one or more subnet slices (306) based on a current admitted packet flows, an available slack, a resource availability. The set of packet flows are mapped to the one or more subnet slices (306), appropriately, where the one or more subnet slices (306) are predictively allocated to the set of packet flows, and dynamically scaled up or down as required.

In an embodiment, the system (102) provides updates from the one or more distributed ledgers (104) for attaining end-to-end resource optimization at a larger time-scale across the one or more subnets slices (306) based on at least one or more parameters to provide end-to-end network slicing. The one or more parameters include a slice policy, a resource allocation parameter, a monitoring parameter, an analytics parameter, a prediction parameter, and an optimization parameter.

In another embodiment, the system (102) records the hierarchical blockchain transactions by the one or more distributed ledgers (104) for Intra-Network slices (306) across the at least one domain (802). The at least one domain (802) can include RAN/Transport/Core/Transport/Remote-Cloud (for Remote Cloud-based applications), RAN/Transport/CollapsedCore/EdgeTransport/EdgeCloud (for Edge Cloud-based applications), and RAN/Transport/Collapsed-Core/Transport/RAN for P2P information exchange. The Intra-Network slices are created with different constraints and entities, wherein the entities comprises private enterprises, edge resources, and the like.

FIG. 2A illustrates an exemplary representation of the system (102) for management of network slicing using hierarchical blockchain, in accordance with an embodiment of the present disclosure.

In an embodiment, and as shown in FIG. 2, the system (102) may include one or more processors (202) coupled with a memory (204). The memory may store instructions which when executed by the one or more processors (202) causes the system (102) to perform one or more functions.

The one or more processors (202) may be implemented as one or more microprocessors, microcomputers, microcontrollers, digital signal processors, central processing units, logic circuitries, and/or any devices that manipulate data based on operational instructions. Among other capabilities, the one or more processor(s) (202) may be configured to fetch and execute computer-readable instructions stored in a memory (204) of the blockchain based system (102). The memory (204) may store one or more computer-readable instructions or routines, which may be fetched and executed to create or share the data units over a network service. The memory (204) may comprise any non-transitory storage device including, for example, volatile memory such as RAM, or non-volatile memory such as EPROM, flash memory, and the like.

The system (102) may also comprise an interface(s) (206). The interface(s) (206) may comprise a variety of interfaces, for example, interfaces for data input and output devices, referred to as I/O devices, storage devices, SCADA, Sensors and the like. The interface(s) (206) may facilitate communication of the system (102) with various devices coupled to it. The interface(s) (206) may also provide a communication pathway for one or more components of the system (102). Examples of such components include, but are not limited to, processing engine(s) (202) and database (230).

The one or more processors (202) may be implemented as a combination of hardware and programming (for example, programmable instructions) to implement one or more functionalities of the one or more processors (202). In examples described herein, such combinations of hardware and programming may be implemented in several different ways. For example, the programming for the one or more processors (202) may be processor executable instructions stored on a non-transitory machine-readable storage medium and the hardware for the one or more processors (202) may comprise a processing resource (for example, one or more processors), to execute such instructions. In the present examples, the machine-readable storage medium may store instructions that, when executed by the processing resource, implement the one or more processors (202). In such examples, the system (102) may comprise the machine-readable storage medium storing the instructions and the processing resource to execute the instructions, or the machine-readable storage medium may be separate but accessible to the system (102) and the processing resource. In other examples, the one or more processors (202) may be implemented by electronic circuitry. In an aspect, the database (210) may comprise data that may be either stored or generated as a result of functionalities implemented by any of the components of the processor (202) or the processing engines (208).

In an exemplary embodiment, the processing engine(s) or modules (208) of the system (102) may include a data receiving module (210) an allocating module (212), an updating module (214), a transaction module (216) and other modules (218), wherein the other modules (218) may further include, without limitation, data receiving module, storage module, computing module, or signal generation module. The system (102) may be implemented using any or a combination of hardware components and software components.

In an embodiment, the data receiving module (210) may include high level functionalities such as receiving the user requests from user for creating the one or more subnet slices 306 and at least one domain 802.

In an embodiment, the allocating module (212), may enable allocation of the one or more distributed ledgers (104) associated with smart contracts for storing information pertaining to resource allocation of the at least one domain (802) and their respective one or more subnet slices (306) of the network (108). The one or more distributed ledgers (104) can perform local blockchain data processing in the at least one respective domain. In addition, the local slice subnet decision-making can occur in each of the RAN or Core or Transport slices based on local smart contracts and information can be recorded in local ledgers at faster rates and for faster local adaptation.

In an embodiment, the updating module (214) may enable the updating of the hierarchical blockchain transactions of the at least one domain (802) to the respective one or more distributed ledgers (104) that is immutable to provide trust and transparency. The one or more distributed ledgers (104) may record transactions and the version of the smart contract logic used to produce the transactions. The distributed ledger (104) may be shared and distributed to all nodes.

In an embodiment, the transaction module (216) may enable the storing of hierarchical blockchain transactions of the at least one domain (802) and their respective one or more subnet slices (306) of the network in the one or more distributed ledgers (104) and utilize based on the requirement of network slicing. The hierarchical blockchain transactions include dynamic resource allocations, resource utilization, soft threshold warnings, resource re-provisioning, and others.

In an implementation, the system (102) may be accessed by applications residing on any operating system, including but not limited to, Android™, iOS™, and the like.

Figure 2B:
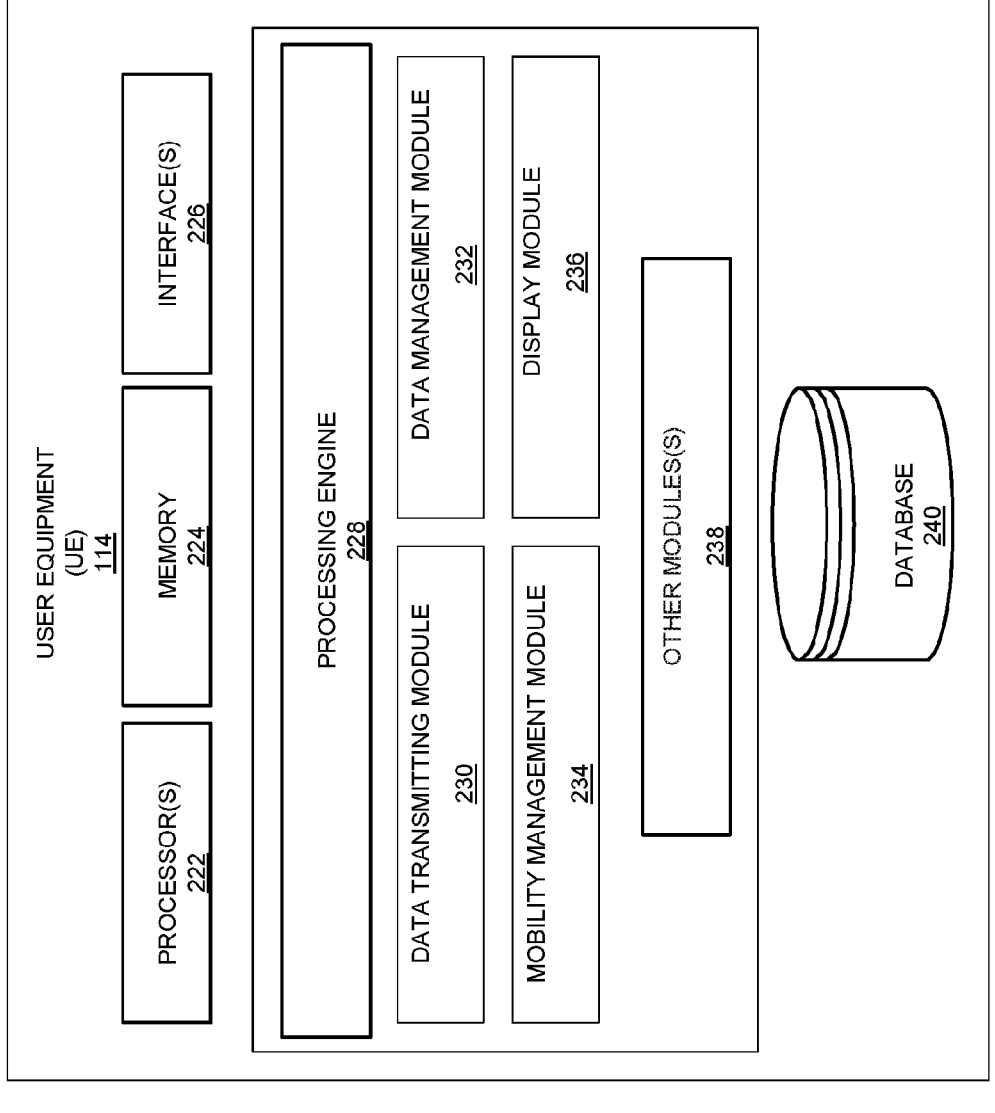
FIG. 2B illustrates an exemplary block diagram representation of the user equipment (114) for management of network slicing using hierarchical blockchain, in accordance with an embodiment of the present disclosure.

FIG. 2B illustrates an exemplary block diagram representation of the user equipment (114) for management of network slicing using hierarchical blockchain, in accordance with an embodiment of the present disclosure.

FIG. 2B illustrates an exemplary representation (250) of the user equipment (UE) (114), in accordance with an embodiment of the present disclosure. In an aspect, the UE (114) may comprise a processor (222). The processor (222) may be an edge based processor but not limited to it. The processor (222) may be implemented as one or more microprocessors, microcomputers, microcontrollers, digital signal processors, central processing units, logic circuitries, and/or any devices that process data based on operational instructions. Among other capabilities, the processor(s) (222) may be configured to fetch and execute computer-readable instructions stored in a memory (224) of the UE (114). The memory (224) may be configured to store one or more computer-readable instructions or routines in a non-transitory computer readable storage medium, which may be fetched and executed to create or share data packets over a network service. The memory (224) may comprise any non-transitory storage device including, for example, volatile memory such as RAM, or non-volatile memory such as EPROM, flash memory, and the like.

In an embodiment, the UE (114) may include an interface(s) 226. The interface(s) 206 may comprise a variety of interfaces, for example, interfaces for data input and output devices, referred to as I/O devices, storage devices, and the like. The interface(s) 206 may facilitate communication of the UE (108). Examples of such components include, but are not limited to, processing engine(s) 228 and a database (240).

The processing engine(s) (228) may be implemented as a combination of hardware and programming (for example, programmable instructions) to implement one or more functionalities of the processing engine(s) (228). In examples described herein, such combinations of hardware and programming may be implemented in several different ways. For example, the programming for the processing engine(s) (228) may be processor executable instructions stored on a non-transitory machine-readable storage medium and the hardware for the processing engine(s) (228) may comprise a processing resource (for example, one or more processors), to execute such instructions. In the present examples, the machine-readable storage medium may store instructions that, when executed by the processing resource, implement the processing engine(s) (228). In such examples, the UE (108) may comprise the machine-readable storage medium storing the instructions and the processing resource to execute the instructions, or the machine-readable storage medium may be separate but accessible to the UE (114) and the processing resource. In other examples, the processing engine(s) (228) may be implemented by electronic circuitry.

In an exemplary embodiment, the processing engine(s)/modules (228) of the UE (114) may include a data transmitting module (230), a data management module (232), a mobility management module (234), a display module (236) and other modules (238), wherein the other modules (238) may further include, without limitation, a session module, storage module, computing module, or signal generation module. The UE (114) may be implemented using any or a combination of hardware components and software components.

In an embodiment, the data transmitting module (230) may include the transfer of the data packets in the form of user request over a point-to-point or point-to-multipoint communication channel. The system (102) is configured to receive the data packets, which are transmitted from the UE (114).

In an embodiment, the data management module (232) may involve the collection, storage, analysis, and sharing of data within the network (108). The UE (114) can be configured to manage the data received from the system (102), where the data may include storing the received one or more distributed ledgers (104), resource sharing, and the like In an embodiment, the mobility management module (234) may enable tracking where the user (112) is allowing calls, SMS and other UE services to be delivered to them.

In an embodiment, the display module (236) may enable presentation of information to the user (112). The system (102) provides end-to-end network slicing information to the UE (114) by managing the hierarchical blockchain transactions across the at least one domain (802) for assisting activities in virtualized deployments in the network (108).

Figure 3:
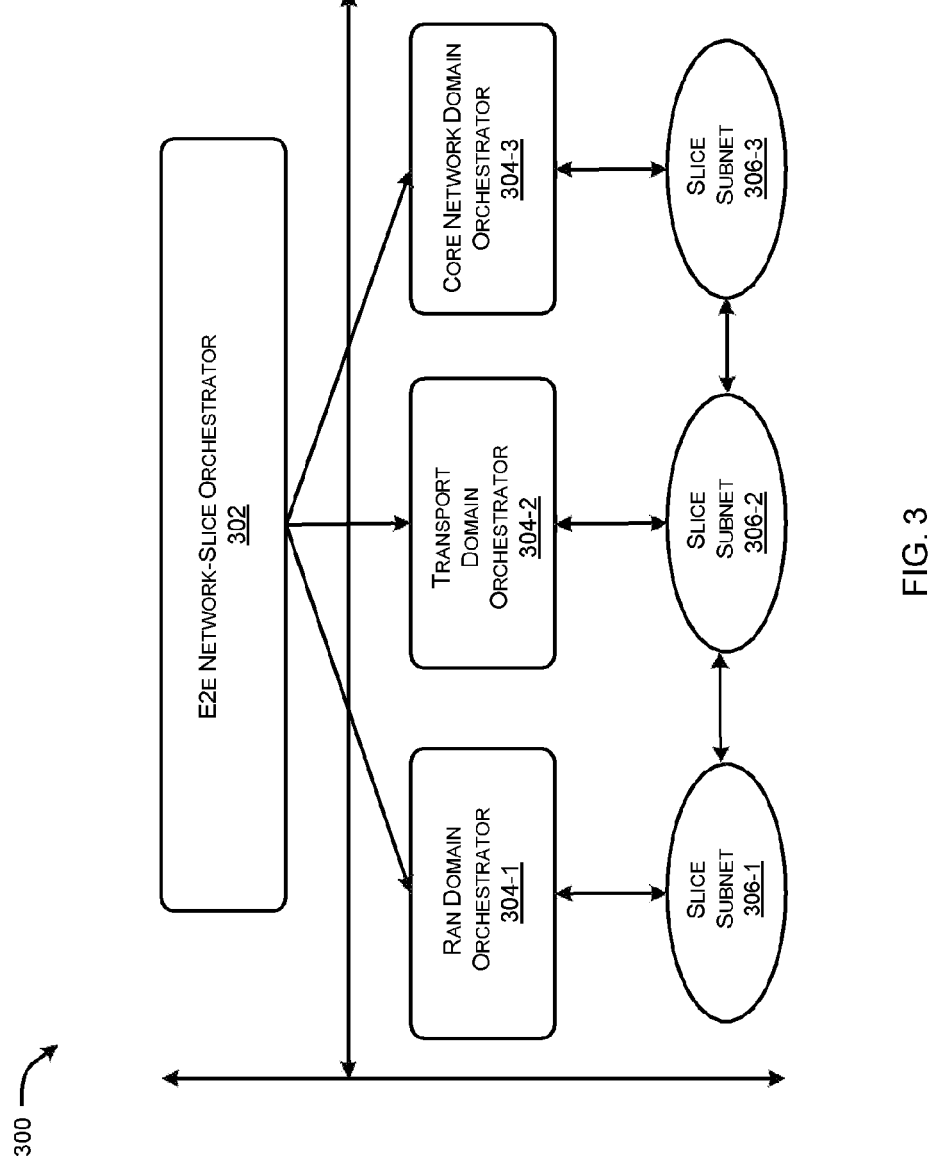
FIG. 3 illustrates an exemplary representation of an E2E cross-network network slice orchestration, in accordance with an embodiment of the present disclosure.

FIG. 3 illustrates an exemplary representation (300) of an End-to-End (E2E) cross-network network slice orchestration, in accordance with an embodiment of the present disclosure.

With respect to FIG. 3, an E2E network slice orchestrator 302 could be a person, or an entity dedicated to perform E2E network level orchestration services which includes sending packets of data back and forth between different networks and across multiple types of devices, domains, and others.

The E2E network slice orchestrator 302 is further classified into respective domain orchestrators such as a RAN (Radio Access Network) domain orchestrator 304-1 that is indeed connected to respective subnet slice 306-1. Further, a transport domain orchestrator 304-2 can be connected to a slice subnet 306-2 and thereafter a core network domain orchestrator 304-3 can be connected to a slice subnet 306-3.

Figure 4:
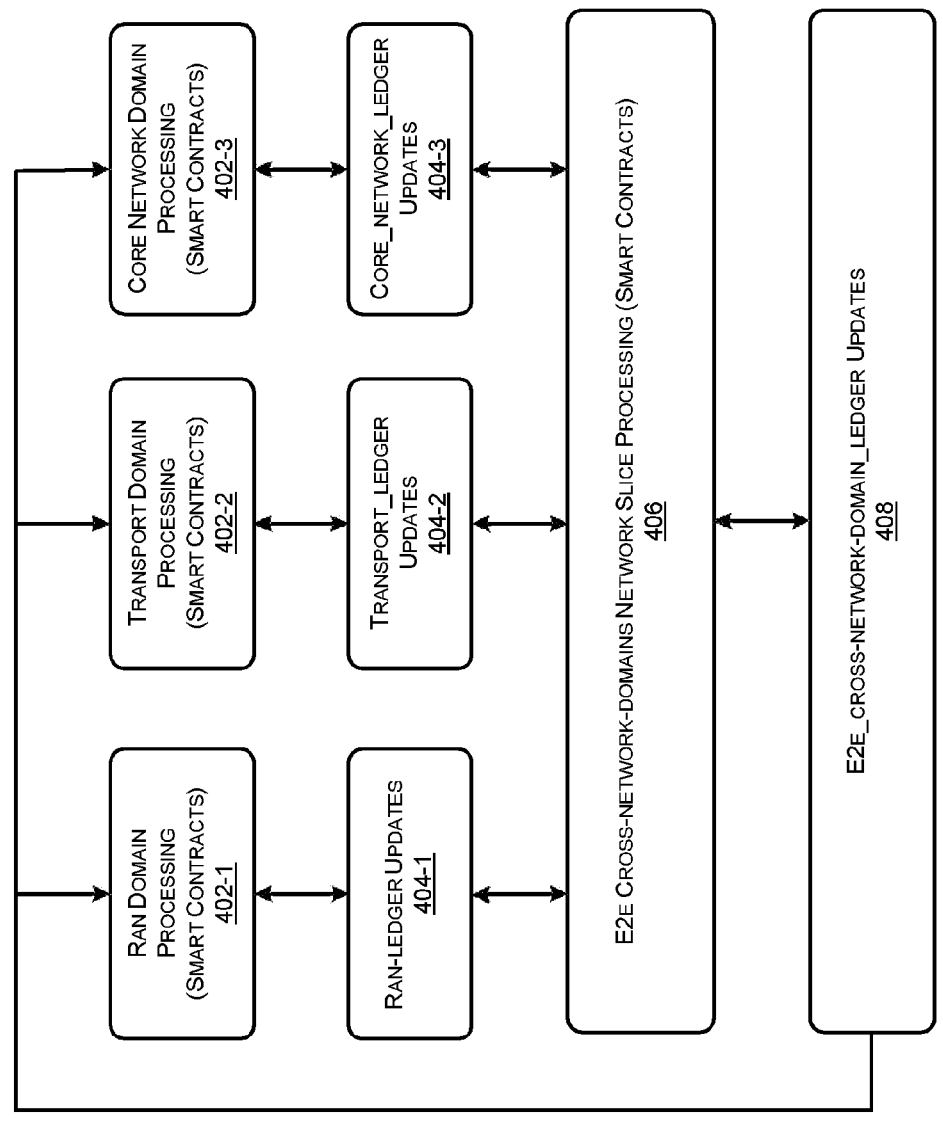
FIG. 4 illustrates an exemplary representation of DLT-based cross network-domains 5G network slice processing, in accordance with an embodiment of the present disclosure.

FIG. 4 illustrates an exemplary representation (400) of Distributed Ledger Technology (DLT)-based cross network-domains 5G network slice processing, in accordance with an embodiment of the present disclosure.

In an embodiment, for a Distributed Ledger Technology (DLT) based network slice processing, distributed chains can coordinate slice subnet information of the slice subnet (306-1, 306-2, 306-3) across RAN domain orchestrator 304-1, transport domain orchestrator 304-2, and core network domain orchestrator 304-3. The DLT-based network slice processing can perform local blockchain data processing in respective domains. In addition, local slice subnet decision-making can occur in each of the RAN slice subnet 306-1 or core slice subnet 306-2 or transport slice subnet 306-3 based on local smart contracts and information can be recorded in respective local ledgers at faster rates and for faster local adaptation.

With reference to FIG. 4, a RAN Domain processing (Smart Contracts) 402-1 may be bi-directionally connected to a RAN-Ledger updates 404-1. A Transport Domain Processing (Smart Contracts) 402-2 can be bi-directionally connected to a Transport-Ledger updates 404-2. Further, a Core Network Domain Processing (Smart Contracts) 402-3 can be bi-directionally connected to a Core Network Ledger updates 404-3. The RAN-Ledger updates block 404-1, the Transport-Ledger updates block 404-2 and the Core Network Ledger updates block 404-3 may be bi-directionally connected to an E2E cross network domains network slice processing (smart contracts) 406. The block E2E cross network domains network slice processing (smart contracts) 406 may be bi-directionally connected to a E2E_Cross-Network-Domain_Ledger updates block 408 which is in turn connected to each of the initial blocks the RAN Domain processing (Smart Contracts) 402-1, Transport Domain Processing (Smart Contracts) 402-3, and the Core Network Domain Processing (Smart Contracts) 402-3.

In an embodiment, the distributed ledger 104 may extend across the RAN Domain processing (Smart Contracts) 402-1, Transport Domain Processing (Smart Contracts) 402-3, and the Core Network Domain Processing (Smart Contracts) 402-3. The distributed ledger 104 can be operated at larger time scales relative to its local ledgers (not shown in this figure) for faster local resource optimization. The RAN domain slice subnet updates may be written to a RAN_LEDGER (not shown in this figure). Further, transport domain slice subnet updates may be written to a TRANSPORT_LEDGER (not shown in this figure). In addition, a Core Network domain slice subnet updates may be written to a CORENETWORK_LEDGER (not shown in this figure). A common E2E_CROSS_NETWORK-DOMAINS_LEDGER_UPDATES 408 may then provide coarse-grain ledger updates for end-to-end resource optimization at a larger time-scale across the network slice subnets which may in turn provide input/feedback to respective network slice subnets for next each of distributed optimization in the network.

Figure 5:
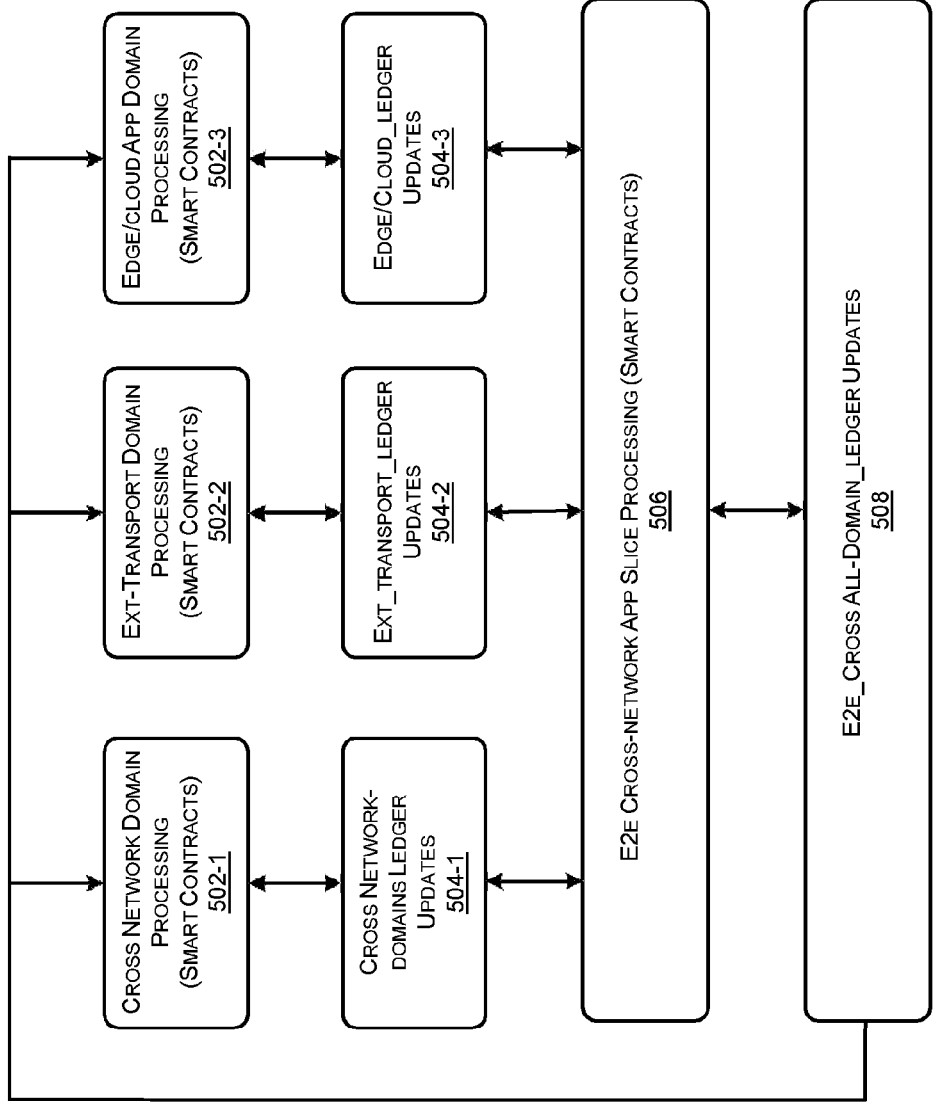
FIG. 5 illustrates an exemplary representation of DLT-based E2E based cross network-application slice processing in 5G network, in accordance with an embodiment of the present disclosure.

FIG. 5 illustrates an exemplary representation (500) of DLT-based E2E based cross network-application slice processing in 5G network, in accordance with an embodiment of the present disclosure.

In an embodiment, "CLOUD" can be at an edge or in-network or remote data center, so that it may be an edge or in-network or remote cloud that hosts the UPF (User Plane Function) and Data Networks. A Cross-Network Domain Processing (Smart Contracts) block 502-1 is bi-directionally connected to a Cross Network-Domains_Ledger_Updates block 504-1. Further, an Ext-Transport Domain Processing (Smart Contracts) block 502-2 is bi-directionally connected to an Ext_Transport_Ledger_Updates block 504-2. Furthermore, an Edge/Cloud App Domain Processing (Smart Contracts) block 502-3 is bi-directionally connected to an Edge/Cloud_Ledger_Updatesblock 504-3. As illustrated in FIG. 5, these blocks are connected bi-directionally to E2E CROSS-DOMAIN NETWORK APP SLICE PROCESSING (smart contracts) block 506 which is in turn connected to an E2E CROSS-ALL-DOMAIN_LEDGER_UPDATES block 508. The E2E Cross-All-Domain_Ledger Updates block 312 is connected further to the Cross-Network Domains Processing block 502-1, the Ext Transport Domain Processing block 502-2 and the Edge/Cloud App DomainProcessing block 502-3.

Figure 6:
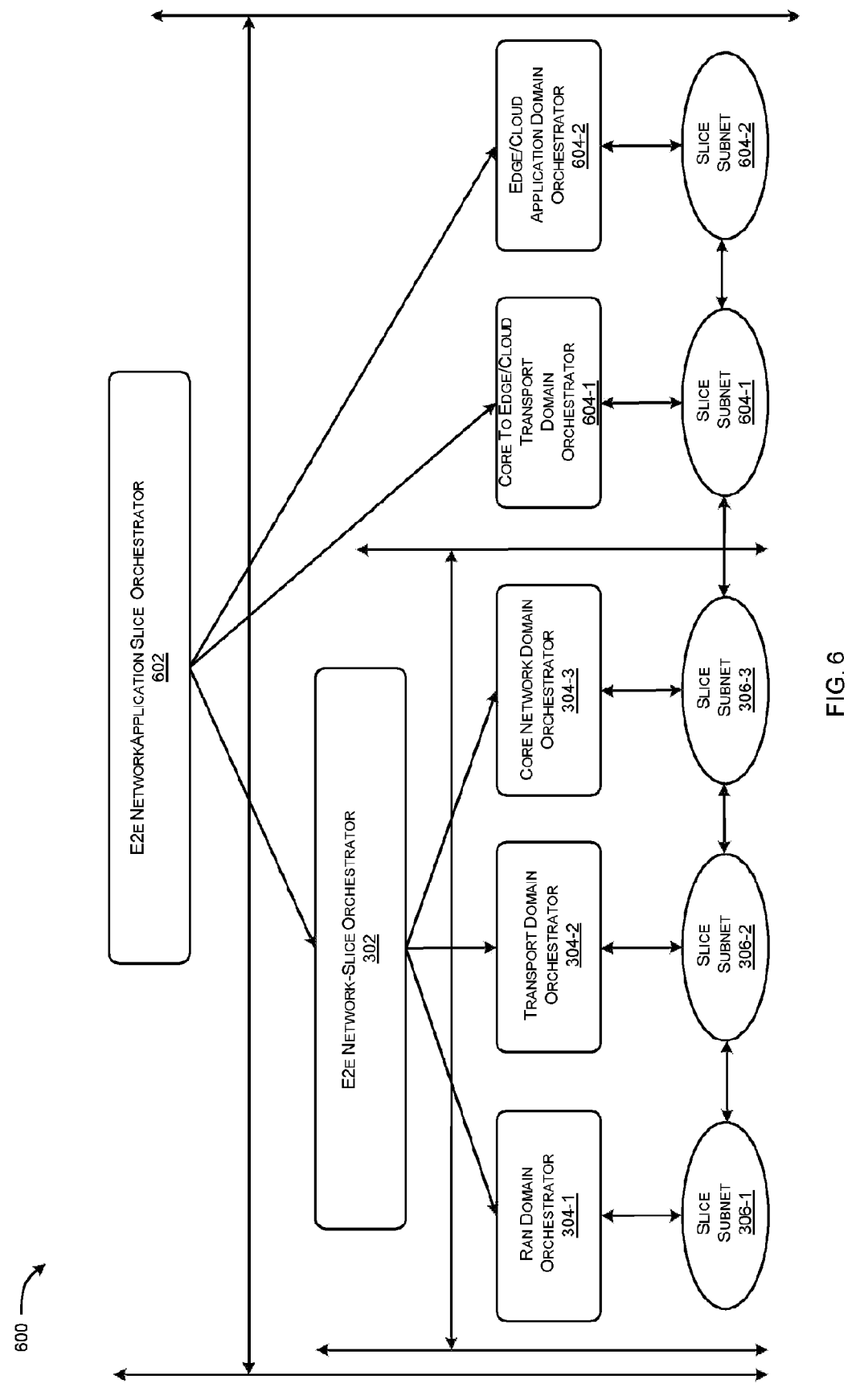
FIG. 6 illustrates an exemplary representation of hierarchical E2E slice orchestration, in accordance with an embodiment of the present disclosure.

FIG. 6 illustrates an exemplary representation (600) of hierarchical E2E slice orchestration, in accordance with an embodiment of the present disclosure.

With reference to FIG. 6, an E2E network application slice orchestrator 602 could be a person, or an entity dedicated to perform E2E application level orchestration services which include user interactions directly with the software application. The E2E network application slice orchestrator 602 is classified into the E2E network-slice orchestrator block 302, a core to edge/cloud transport domain orchestrator 604-1, and a edge/cloud application domain orchestrator 604-2. The E2E network slice orchestrator 302 is further classified into respective domain orchestrators such as a RAN domain orchestrator 304-1 that is indeed connected to respective subnet slice 306-1. Further, a transport domain orchestrator 304-2 can be connected to a slice subnet 306-2 and thereafter a core network domain orchestrator 304-3 can be connected to a slice subnet 306-3.

In an embodiment, the E2E network application slice orchestrator block 602 is connected to a core to edge/cloud transport domain orchestrator 412 which may be connected to a slice subnet 604-1. The E2E network application slice orchestrator block 602 is also connected to an edge/cloud application domain orchestrator 604-2 which may be connected to a slice subnet 604-2. In an embodiment, each of the slice subnets 306-1 to 306-3, and 604-1, 604-2 may be connected to each other.

Figure 7:
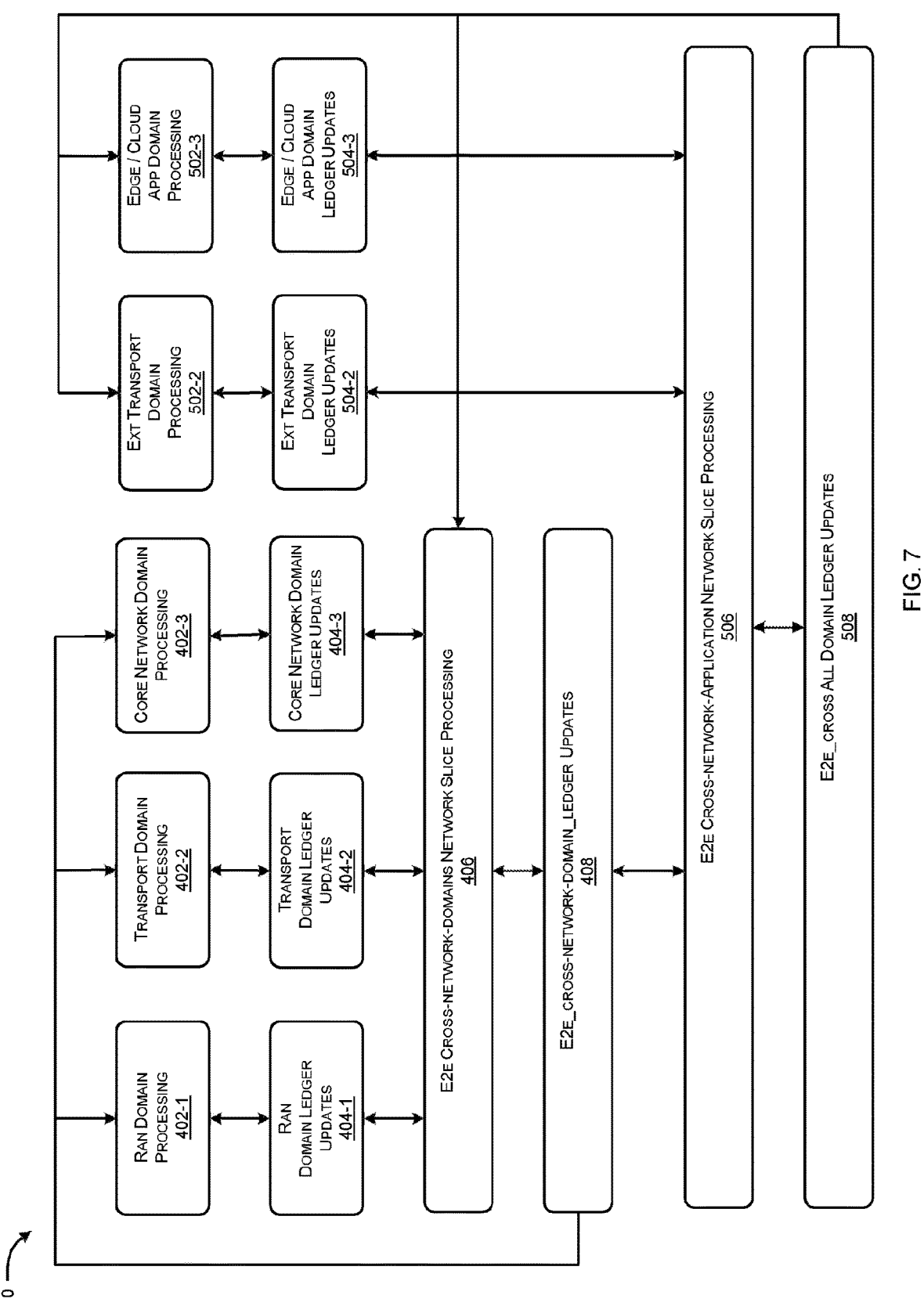
FIG. 7 illustrates a combined hierarchical DLT for E2E network slice processing, in accordance with an embodiment of the present disclosure.

FIG. 7 illustrates a combined hierarchical DLT for E2E network slice processing, in accordance with an embodiment of the present disclosure.

With respect to FIG. 7, the RAN Domain processing (Smart Contracts) 402-1 may be bi-directionally connected to the RAN-Ledger updates 404-1. The Transport Domain Processing (Smart Contracts) 402-2 can be bi-directionally connected to the Transport-Ledger updates 404-2. Further, the Core Network Domain Processing (Smart Contracts) 402-3 can be bi-directionally connected to the Core Network Ledger updates 404-3. The E2E cross network domains network slice processing 406 may be bi-directionally connected to the E2E_Cross-Network-Domain_Ledger updates block 408. The output from the E2E_Cross-Network-Domain_Ledger updates block 408 is in turn provided as feedback to each of the initial blocks the RAN Domain processing 402-1, the Transport Domain Processing 402-3, and the Core Network Domain Processing 402-3.

In an embodiment, the Ext-Transport Domain Processing block 502-2 is bi-directionally connected to the Ext_Transport_Ledger_Updates block 504-2. The Edge/Cloud App Domain Processing block 502-3 is bi-directionally connected to the Edge/Cloud_Ledger_Updatesblock 504-3. Further, the E2E_Cross-Network-Domain_Ledger updates block 408, the Ext_Transport_Ledger_Updates block 504-2, and the Edge/Cloud_Ledger_Updatesblock 504-3 are connected bi-directionally to E2E CROSS-DOMAIN NETWORK APP SLICE PROCESSING block 506 which is in turn bi-directionally connected to the E2E CROSS-ALL-DOMAIN_LEDGER_UPDATES block 508. Finally, the output from the E2E CROSS-ALL-DOMAIN_LEDGER_UPDATES block 508 is in turn provided as feedback to each of the initial blocks the Ext-Transport Domain Processing block 502-2, and the Edge/Cloud App Domain Processing block 502-3.

Figure 8:
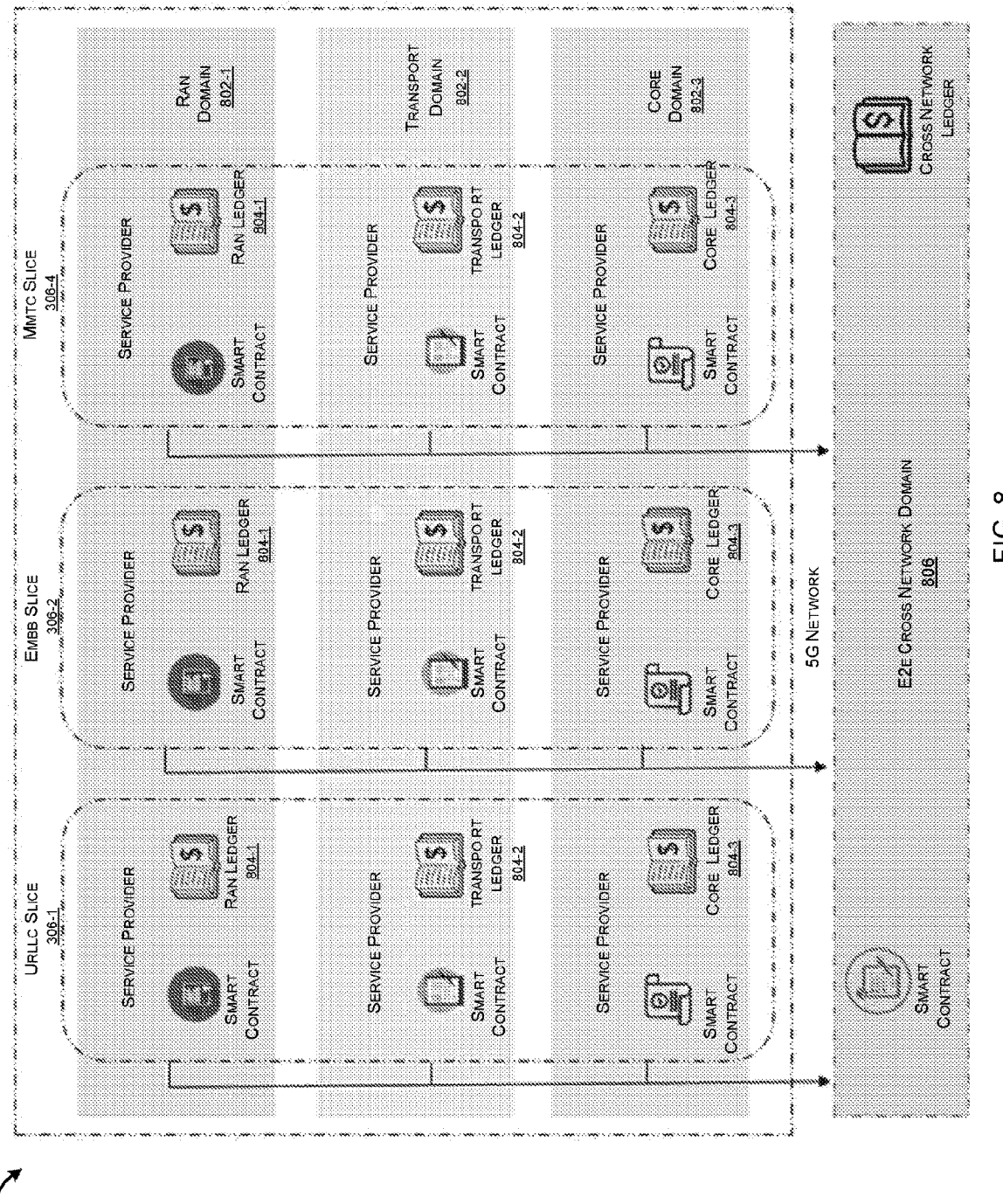
FIG. 8 illustrates an exemplary hierarchical network slicing with ledger, in accordance with an embodiment of the present disclosure.

FIG. 8 illustrates an exemplary hierarchical network slicing with ledger, in accordance with an embodiment of the present disclosure.

In an embodiment, with respect to network slicing overview in the DLT-based network slicing, let us assume that domains $D_1, D_2, \ldots, D_M$ where a subset of the at least one domain (802) may be used to create the one or more subnet slices (306). Some of the at least one domain (802) may terminate in an access cloud or an edge cloud or a remote cloud. Consider each of the at least one domain (802) $D_i$, where $0 \leq i \leq M$. Let us assume that there are $N_i$ Network Slice Subnet Instances (NSSI's) available for each domain $D_i$. The available NSSIs are selected for each domain, and combined to create an end-to-end slice. Further, more than one NSSI for each domain can be selected if needed to meet performance or service requirements. Consider an NSSI $S_{i,k}$ where $0 \leq k \leq M_i$—within each domain, there can be multiple NSSI's to select resources. The NSSIs may be deployed instances of the one or more subnet slices (306). The NSSIs may be concatenated across the one or more subnet slices (306) to form an NSI. In each network slice, multiple flows can be admitted. The flow constraints for admitted flows should be less constrained than the slice constraints. For example, the latency constraints for an admitted flow in a slice should be higher than or equal to the latency constraint for the slice. The sum of bandwidth requirements across flows that need to be supported concurrently should be less than the overall dynamic capacity available for the slice.

In an embodiment, the hierarchical blockchain distributed ledgers 104 may be used to support end-to-end network slicing in 5G Networks. With respect to FIG. 8, at least one domain (802) can be created for RAN 802-1/Transport 802-2/Core 802-3 (collectively known as at least one domain 802). Further, the cross-domain ledgers may be used to record transaction allocations for Intra-Network Slices 806 (also known as cross network domain 806) across at least one domain 802. The intra-Network slices may be created for different slices such as Ultra-Reliable Low Latency Communications (URLLC) (306-1), the enhanced mobile broadband (eMBB) (306-2), and the massive Machine-Type Communications (mMTC) slices (306-3) (collectively known as slice subnets 304) with different constraints. Further, the different slices 306 can exist with different entities being supported including private enterprises, edge resources, MVNOs, etc. and these may be participants on the ledger for the resource allocations for the Intra-Network Ledgers.

In an embodiment, the resource requirements for a flow can be constrained as per flow admission requirements, they can be overprovisioned if desired, and such requirements can be relaxed as well if resource requirements reduce. Further, based on the current admitted flows, the available slack or resource availability can be determined to admit new flows. Soft thresholds can be used to trigger warnings with regard to resource utilization, which can help with provisioning additional resources if required. The smart contracts can be used to process such requirements and record transactions in appropriate ledgers in the network hierarchy.

In another embodiment, eventual end-to-end co-ordination may be maintained across the network slice domains. Further, end-to-end coarse resource optimization for a network slice could be performed at slower time-scales. Thus, a blockchain network may extend across different entities that could dynamically coordinate their resources to provide services in 5G/future networks.

In another embodiment, at least one domain (802) can include RAN/Transport/Core/Transport/RemoteCloud (for Remote Cloud-based applications), RAN/Transport/CollapsedCore/EdgeTransport/EdgeCloud (for Edge Cloud-based applications), and RAN/Transport/CollapsedCore/Transport/RAN for P2P information exchange may have a well-defined smart contract specific to the at least one domain 802. The smart contract may track the usage of the domain resources for the network slice, based on the usage of resources and smart contract, the domain ledger may get updated.

In an embodiment, different flows may be supported with the one or more subnet slices (306), and flows may utilize the one or more subnet slices (306) for redundancy. The End-to-End Network slices may include resources beyond the intra-network domains such as cloud or edge resources or private enterprise resources, and across different networks/network paths. The end-to-end network slices may provide end-to-end support for different types of verticals or application such as automotive, healthcare, private-5G-enterprises, AR/VR/MR applications, different edge applications, different edge applications, holographic communication, industrial automation, smart environments, e-health etc. In addition, resource providers for different slices can be participants in ledger transactions for such end-to-end slices. Also, End-to-End flows can utilize multiple slices across Networks/Resource providers (such as cloud providers) for redundancy. In an embodiment, resource providers for different slices may be participants in ledger transactions for such end-to-end slices and end-to-end flows can utilize multiple slices across networks/resource providers (such as cloud providers) for redundancy.

In another embodiment, vDLT/Blockchain transactions related to dynamic resource allocations, resource utilization, soft threshold warnings, resource re-provisioning, etc. may be recorded in these hierarchical ledgers with smart contract processing to meet constraints, with the hierarchical ledgers may utilize to provide transparency and assist with future billing in such hierarchical virtualized deployments.

In an embodiment, different flows may be supported with each slice, and flows may utilize multiple slices for redundancy. End-to-End Network slices may include resources beyond the intra-network domains such as cloud or edge resources or private enterprise resources, and across different networks/network paths. The end-to-end network slices may provide end-to-end support for different types of verticals or application such as automotive, healthcare, private-5G-enterprises, AR/VR/MR applications, different edge applications, etc.

In an embodiment, resource providers for different slices may be participants in ledger transactions for such end-toend slices and end-to-end flows can utilize multiple slices across networks/resource providers (such as cloud providers) for redundancy. In another embodiment, vDLT/Blockchain transactions related to dynamic resource allocations, resource utilization, soft threshold warnings, resource re-provisioning, etc. may be recorded in these hierarchical ledgers with smart contract processing to meet constraints, with the hierarchical ledgers may utilize to provide transparency and assist with future billing in such hierarchical virtualized deployments.

In an embodiment, the end-to-end information of all the domains for a network slice may be recorded to the end-to-end cross domain network using smart contact of cross domain. The inputs to the smart contracts are from individual domains for a slice type. Cross domain smart contract may track the resources being used across the domains to support a slice type and accordingly may update the cross network domain ledger. This provides a 360-degree view of every resource being used to support any network slice end-to-end and therefore accordingly, the expenditure may be calculated and settled on real-time without any dispute.

FIG. 9 illustrates an exemplary flowchart for management of network slicing using hierarchical blockchain, in accordance with an embodiment of the present disclosure.

In an embodiment, the method for management of network slicing using hierarchical blockchain in a network. At step 902, the method includes receiving, by a system, a user request to create one or more subnet slices based on at least one Network Subset Instances (NSSIs) of at least one domain in the network. Further, at step 904, the method includes allocating, by the system, one or more distributed ledgers associated with smart contracts for storing information pertaining to resource allocation of the at least one domain and their respective one or more subnet slices of the network. At step 906, the method includes recording, by the system, one or more hierarchical blockchain transactions pertaining to the resource allocation by the one or more distributed ledgers to coordinate the one or more subnet slices across the at least one domain. At step 908, the method includes updating, by the system, the one or more distributed ledgers with the hierarchical blockchain transactions of the at least one domain and their respective one or more subnet slices of the network. Finally, at step 910, the method includes providing, by the system, end-to-end network slicing by managing the hierarchical blockchain transactions across the at least one domain for assisting activities in virtualized deployments in the network.

Figure 10:
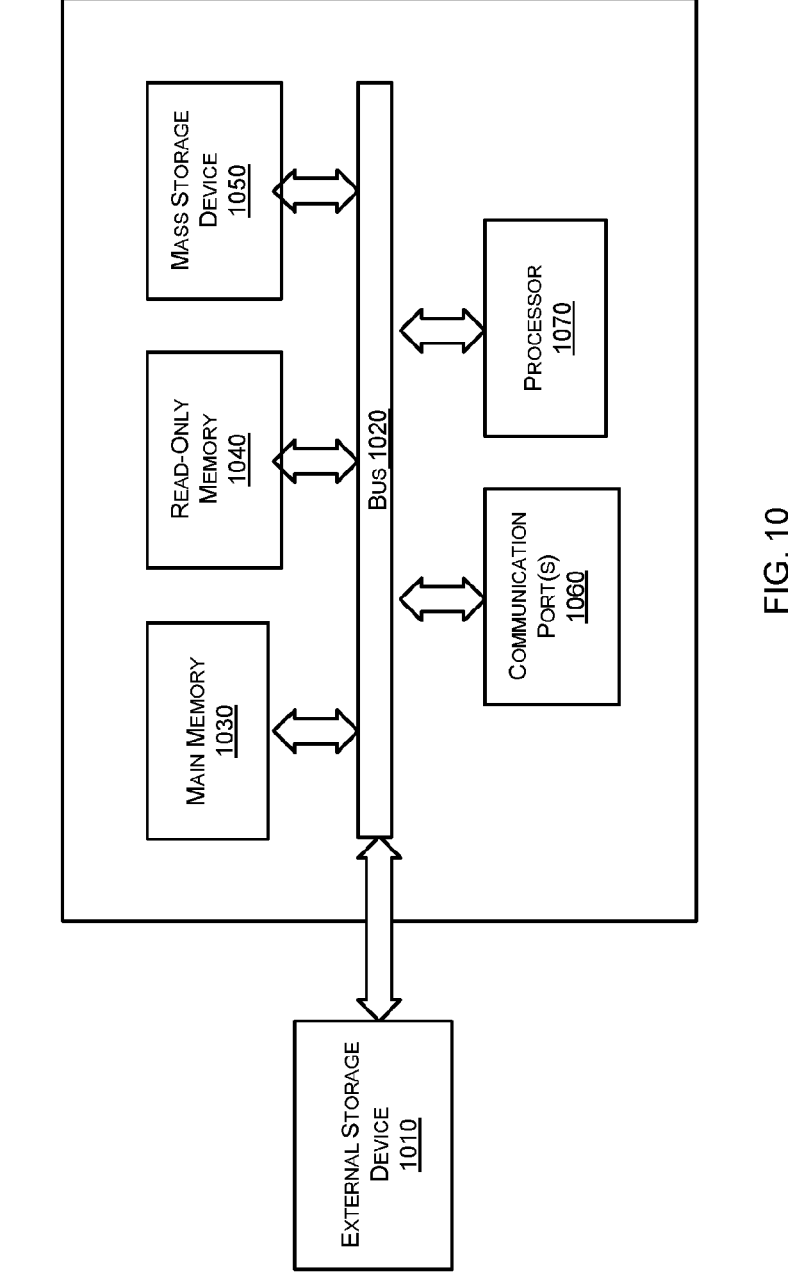
FIG. 10 illustrates an exemplary computer system in which or with which embodiments of the present invention can be utilized in accordance with embodiments of the present disclosure.

FIG. 10 illustrates an exemplary computer system in which or with which embodiments of the present invention can be utilized in accordance with embodiments of the present disclosure.

As shown in FIG. 10, computer system (1000) can include an external storage device (1010), a bus (1020), a main memory (1030), a read only memory (1040), a mass storage device (1050), communication port (1060), and a processor (1070). A person skilled in the art will appreciate that the computer system may include more than one processor and communication ports. Processor (1070) may include various modules associated with embodiments of the present invention. Communication port (1080 can be any of an RS-232 port for use with a modem based dialup connection, a 10/100 Ethernet port, a Gigabit or 10 Gigabit port using copper or fiber, a serial port, a parallel port, or other existing or future ports. Communication port (1080 may be chosen depending on a network, or any network to which computer system connects. Memory 1030 can be Random Access Memory (RAM), or any other dynamic storage device commonly known in the art. Read-only memory (1040) can be any static storage device(s). Mass storage (1050) may be any current or future mass storage solution, which can be used to store information and/or instructions.

Bus (1020) communicatively couples processor(s) (1070) with the other memory, storage and communication blocks.

Optionally, operator and administrative interfaces, e.g. a display, keyboard, joystick and a cursor control device, may also be coupled to bus (1020) to support direct operator interaction with a computer system. Other operator and administrative interfaces can be provided through network connections connected through communication port (1060). Components described above are meant only to exemplify various possibilities. In no way should the aforementioned exemplary computer system limit the scope of the present disclosure.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. In addition, latest releases of a 3rd Generation Partnership Project (3GPP) TS 38.300-5G RAN architecture, a 3GPP TS 23.501-5GS Architecture and 3GPP TS 23.502-5GS Procedures do provide mechanisms for allocation/monitoring/provisioning for the resources. However, these standards lack using Virtual Distributed Ledger Technology (vDLT) aspects for managing the resources.

Advantages of the Present Disclosure

The present disclosure provides Virtualization for Distributed Ledger Technology (vDLT) based transactions to extend network/compute/storage resources to support different verticals, private enterprises, Mobile Virtual Network Operator (MVNO), or edge use-cases with slicing support, smart contract processing and transaction recording for hierarchical slice resource allocations and billing management.

The present disclosure provides the vDLT based transactions that are extended across participating entities/networks/cloud/edge providers to provide end-to-end slicing support.

The present disclosure provides the vDLT based transactions where hierarchical ledgers are utilized to provide transparency and assist with future billing in hierarchical virtualized deployments.

The present disclosure provides the vDLT based transactions to execute smart contracts for resource allocation/monitoring/provisioning and to record transactions in hierarchical ledgers in 5G/6G networks.

The present disclosure provides the vDLT based transactions to provide end-to-end co-ordination across the network slice domains.

The present disclosure provides hierarchical ledgers to execute smart contracts as network slicing occurs at different levels of granularity.

We claim:

1. A system (102) for management of network slicing using hierarchical blockchain in a network (108), the system (102) comprising:

one or more processors (202) coupled with a memory (204), wherein said memory (204) stores instructions which when executed by the one or more processors (202) causes the system (102) to:

receive, a user request to create one or more subnet slices (306) using the hierarchical blockchain based on at least one Network Subset Instances (NSSIs) of at least one domain (802) of a plurality of domains in the network (108);

allocate, one or more distributed ledgers (104) associated with smart contracts for storing information pertaining to resource allocation of the at least one domain (802) of the plurality of domains and their respective one or more subnet slices (306) of the network (108);

record, one or more hierarchical blockchain transactions pertaining to the resource allocation by the one or more distributed ledgers (104) to coordinate the one or more subnet slices (306) across the at least one domain (802) of the plurality of domains;

update, the one or more distributed ledgers (104) with the hierarchical blockchain transactions of the at least one domain (802) of the plurality of domains and their respective one or more subnet slices (306) of the network (108); and provide, end-to-end network slicing by managing the hierarchical blockchain transactions across the at least one domain (802) of the plurality of domains for assisting activities in virtualized deployments in the network (108), wherein the end-to-end network slicing is provided based on a dynamic combination of a plurality of NSSIs of the plurality of domains (802), wherein the plurality of NSSIs and the plurality domains are selected for the combination based on one or more predefined parameters.

2. The system (102) as claimed in claim 1, the system (102) is further configured to, by one or more Artificial Intelligence (AI) models (106), dynamically compute availability of resources to enable resource allocation to the one or more subnet slices (306) of the at least one domain (802) of the plurality of domains in the network (108).

3. The system (102) as claimed in claim 2, wherein the one or more AI models (106) is further configured to:

allocate resources to the at least one domain (802) depending on at least one of network constraints and storage constraints, wherein, the network constraints include latency or bandwidth for communication of information, and the storage constraints include availability of storage, and read and/or write latencies, and bandwidth associated with storage.

4. The system (102) as claimed in claim 1, wherein the system (102) is configured to admit, a set of packet flow in the one or more subnet slices (306) based on a current admitted packet flows, an available slack, and a resource availability, wherein constraints for the current admitted packet flows are less than predefined constraints for the one or more subnet slices (306).

5. The system (102) as claimed in claim 4, wherein the system (102) is configured to:

map, the set of packet flows to the one or more subnet slices, appropriately, wherein the one or more subnet slices (306) are predictively allocated to the set of packet flows, and dynamically scaled up or down as required.

6. The system (102) as claimed in claim 1, wherein the system (102) is configured to:

provide, updates from the one or more distributed ledgers (104) for attaining end-to-end resource optimization at a larger time-scale across the one or more subnets slices (306) based on at least one or more parameters to provide end-to-end network slicing, wherein the one or more parameters include a slice policy, a resource allocation parameter, a monitoring parameter, an analytics parameter, a prediction parameter, and an optimization parameter.

7. The system (102) as claimed in claim 1, wherein the system (102) is configured to:

record, the hierarchical blockchain transactions by one or more cross domain distributed ledgers (104), associated with a cross domain contract, for Intra-Network slices (306) across the plurality of domains, wherein the Intra-Network slices (306) are created for different network slices with different constraints and entities, wherein the entities comprise at least one of private enterprises and edge resources wherein the cross domain smart contract tracks resources being used across the plurality of domains and updates the one or more cross network domain distributed ledgers based on the tracked resources.

8. The system (102) as claimed in claim 1, wherein the at least one domain (802) include Radio Access Network (RAN)/Transport/Core/Transport/RemoteCloud (for Remote Cloud-based applications), RAN/Transport/CollapsedCore/EdgeTransport/EdgeCloud (for Edge Cloud-based applications), and RAN/Transport/CollapsedCore/Transport/RAN for Peer-to-Peer (P2P) information exchange.

9. The system (102) as claimed in claim 1, wherein the activities in virtualized deployments include future billing, updating records, and tracking application status and others.

10. The system (102) as claimed in claim 1, wherein the user (112) is a network administrator, a network operator, and others.

11. The system (102) as claimed in claim 1, wherein the one or more hierarchical blockchain transactions include dynamic resource allocations, resource utilization, soft threshold warnings, resource re-provisioning, and others.

12. A user equipment (UE) (114) for management of network slicing using hierarchical blockchain in a network (108), the UE (114) comprising:

one or more processors (222) coupled with a memory (224), wherein said memory (224) stores instructions which when executed by the one or more processors (222) causes the UE (114) to communicate with a system (102), wherein the system (102) is configured to:

receive, a user request to create one or more subnet slices (306) using the hierarchical blockchain based on at least one Network Subset Instances (NSSIs) of at least one domain (802) of a plurality of domains in the network (108);

allocate, one or more distributed ledgers (104) associated with smart contracts for storing information pertaining to resource allocation of the at least one domain (802) of the plurality of domains and their respective one or more subnet slices (306) of the network (108);

record, one or more hierarchical blockchain transactions pertaining to the resource allocation by the one or more distributed ledgers (104) to coordinate the one or more subnet slices (306) across the at least one domain (802) of the plurality of domains;

update, the one or more distributed ledgers (104) with the hierarchical blockchain transactions of the at least one domain (802) of the plurality of domains and their respective one or more subnet slices (306) of the network (108); and provide, end-to-end network slicing by managing the hierarchical blockchain transactions across the at least one domain (802) of the plurality of domains for assisting activities in virtualized deployments in the network (108), wherein the end-to-end network slicing is provided based on a dynamic combination of a plurality of NSSIs of the plurality of domains (802), wherein the plurality of NSSIs and the plurality domains are selected for the combination based on one or more predefined parameters.

13. A method for management of network slicing using hierarchical blockchain in a network, the method comprising:

receiving, by a system (102), a user request to create one or more subnet slices (306) using the hierarchical blockchain based on at least one Network Subset Instances (NSSIs) of at least one domain (802) of a plurality of domains in the network (108);

allocating, by the system (102), one or more distributed ledgers (104) associated with smart contracts for storing information pertaining to resource allocation of the at least one domain (802) of the plurality of domains and their respective one or more subnet slices (306) of the network (108);

recording, by the system (102), one or more hierarchical blockchain transactions pertaining to the resource allocation by the one or more distributed ledgers (104) to coordinate the one or more subnet slices (306) across the at least one domain (802) of the plurality of domains;

updating, by the system (102), the one or more distributed ledgers (104) with the hierarchical blockchain transactions of the at least one domain (802) of the plurality of domains and their respective one or more subnet slices (306) of the network (108); and providing, by the system (102), end-to-end network slicing by managing the hierarchical blockchain transactions across the at least one domain (802) of the plurality of domains for assisting activities in virtualized deployments in the network (108), wherein the end-to-end network slicing is provided based on a dynamic combination of a plurality of NSSIs of the plurality domains (802), wherein the plurality of NSSIs and the plurality domains are selected for the combination based on one or more predefined parameters.

14. The method as claimed in claim 13, wherein the method further comprises the step of:

dynamically computing, by one or more Artificial Intelligence (AI) models (106), availability of resources to enable resource allocation to the one or more subnet slices (306) of the at least one domain (802) of the plurality of domains in the network (108).

15. The method as claimed in claim 14, wherein the method further comprises the step of:

allocating, by the one or more AI models (106), resources to the at least one domain (802) depending on at least one of network constraints and storage constraints, wherein, the network constraints include latency or bandwidth for communication of information, and the storage constraints include availability of storage, and read and/or write latencies, and bandwidth associated with storage.

16. The method as claimed in claim 13, wherein the method further comprises the step of:

admitting, by the system (102), a set of packet flow in the one or more subnet slices (306) based on a current admitted packet flows, an available slack, and a resource availability, wherein constraints for the current admitted packet flows are less than predefined constraints for the one or more subnet slices (306).

17. The method as claimed in claim 16, wherein the method further comprises the step of:

mapping, by the system (102), the set of packet flows to the one or more subnet slices, appropriately, wherein the one or more subnet slices (306) are predictively allocated to the set of packet flows, and dynamically scaled up or down as required.

18. The method as claimed in claim 13, wherein the method further comprises the step of:

providing, by the system (102), updates from the one or more distributed ledgers (104) for attaining end-to-end resource optimization at a larger time-scale across the one or more subnets slices (306) based on at least one or more parameters to provide end-to-end network slicing, wherein the one or more parameters include a slice policy, a resource allocation parameter, a monitoring parameter, an analytics parameter, a prediction parameter, and an optimization parameter.

19. The system (102) as claimed in claim 1, wherein the system (102) is configured to:

record, the hierarchical blockchain transactions by the one or more cross domain distributed ledgers (104), associated with a cross domain contract, for Intra-Network slices (306) across the plurality of domains, wherein the Intra-Network slices (306) are created for different network slices with different constraints and entities, wherein the entities comprises at least one of private enterprises and edge resources wherein the cross domain smart contract tracks resources being used across the plurality of domains and updates the one or more cross network domain distributed ledgers based on the tracked resources.

20. The method as claimed in claim 13, wherein the at least one domain (802) include Radio Access Network (RAN)/Transport/Core/Transport/RemoteCloud (for Remote Cloud-based applications), RAN/Transport/CollapsedCore/EdgeTransport/EdgeCloud (for Edge Cloud-based applications), and RAN/Transport/CollapsedCore/Transport/RAN for Peer-to-Peer (P2P) information exchange.

21. The method as claimed in claim 13, wherein the activities in virtualized deployments include future billing, updating records, and tracking application status and others.

22. The method as claimed in claim 13, wherein the user (112) is a network administrator, a network operator, and others.

23. The method as claimed in claim 13, wherein the one or more hierarchical blockchain transactions include dynamic resource allocations, resource utilization, soft threshold warnings, resource re-provisioning, and others.

24. A non-transitory computer readable medium comprising processor-executable instructions that cause a processor to:

receive a user request to create one or more subnet slices (306) using the hierarchical blockchain based on at least one Network Subset Instances (NSSIs) of at least one domain (802) of a plurality of domains in a network (108);

allocate one or more distributed ledgers (104) associated with smart contracts for storing information pertaining to resource allocation of the at least one domain (802) of the plurality of domains and their respective one or more subnet slices (306) of the network (108);

record one or more hierarchical blockchain transactions pertaining to the resource allocation by the one or more distributed ledgers (104) to coordinate the one or more subnet slices (306) across the at least one domain (802) of the plurality of domains;

update the one or more distributed ledgers (104) with the hierarchical blockchain transactions of the at least one domain (802) of the plurality of domains and their respective one or more subnet slices (306) of the network (108); and provide end-to-end network slicing by managing the hierarchical blockchain transactions across the at least one domain (802) of the plurality of domains for assisting activities in virtualized deployments in the network (108), wherein the end-to-end network slicing is provided based on a dynamic combination of a plurality of NSSIs of the plurality of domains (802), wherein the plurality of NSSIs and the plurality domains are selected for the combination based on one or more predefined parameters.

* * * * *